Figure 1:
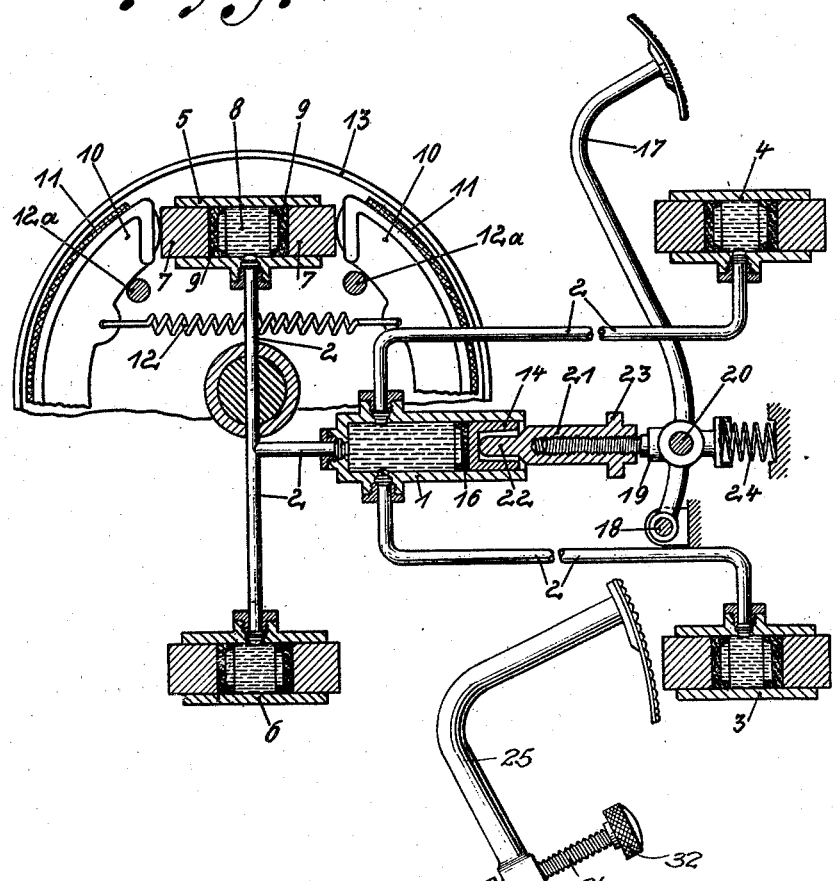

Aug. 9, 1938.   H. K. WEIHE   2,126,296
HYDRAULIC BRAKE
Filed June 12, 1935

H. K. Weihe
Inventor

By: Glascock Downing & Seebold
Attys.

Patented Aug. 9, 1938

2,126,296

UNITED STATES PATENT OFFICE 2,126,296

HYDRAULIC BRAKE

Hermann Kurt Weihe, Berlin, Germany

Application June 12, 1935, Serial No. 26,268
In Germany June 12, 1934

3 Claims. (Cl. 188—152)

This invention relates to hydraulic brakes, more particularly those of motor vehicles, having an arrangement for providing and maintaining a definite initial stressing in the pipe system of the brake. Owing to the initial stressing the correct seating of the packing cups is maintained, even when the brake is in the released state and the penetration of air into the pipe system is also prevented. With the aid of such a pressure regulating arrangement it becomes possible to remove the back lash of the brake lever resulting in the course of time from wear at the coacting braking surfaces and from any fluid losses.

Adjusting devices serving these purposes are known per se. The various known constructions all have different faults. Thus, for instance, there are arrangements, in which the initial stressing in the pipe systems of the brakes is produced by a special additional piston. Such a pressure regulating arrangement is however very complicated and costly as regards its construction and also occupies much space. Other known constructions, in which the pressure piston in the main braking cylinder is adjusted, have the disadvantage, in addition to that of being composed of many parts, that, in readjusting the pressure piston or adjusting the initial stressing in the pipe system, the position of the brake actuating lever is each time also changed, so that the path moved through by the brake lever, when braking, is different each time. This causes the driver of the motor vehicle to lose the feeling of sureness when driving, as he has become used to a definite brake lever motion.

According to the invention a pressure regulating arrangement for setting a definite initial stressing in the brake pipe system is provided, in which, by altering the position of the piston in the main pressure cylinder, the initial stressing can be adjusted and regulated. The adjusting members are disposed between the main pressure piston and the brake operating lever, the arrangement being such that they can displace only the main pressure piston, while leaving the brake operating lever uninfluenced in its normal position, the latter thus always occupying the same initial position (position of rest) at every change in the initial stressing. Screw members are with advantage used as the adjusting members, through the rotation of which with respect to one another the rodwork between the main pressure piston and the brake operating lever is shortened or lengthened, a change in the initial stressing in the pipe system of the brake being thereby caused.

Further details of the invention are hereinafter explained with reference to the accompanying drawing.

As compared with known pressure regulating arrangements, the invention with a small number of parts and a small amount of space provides an extremely simple and cheap adjusting arrangement for setting and regulating the initial stressing in the brake pipe system, which moreover is convenient to operate and is absolutely sure and reliable in its action.

Figure 2:
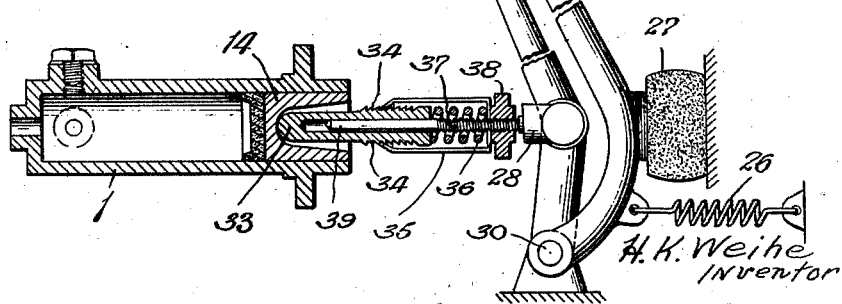

The accompanying drawing gives different constructional examples of the invention, Fig. 1 being a diagrammatic representation of a hydraulic brake installation with the device according to the invention for adjusting the piston in the main pressure cylinder and Fig. 2 a side view, partly in section, of another constructional form of the invention.

1 is the main brake cylinder, from which the brake pipes 2 lead to the individual wheel brake cylinders 3, 4, 5, and 6. Each wheel brake cylinder contains two pistons 7 adapted to move in opposite directions, which enclose between them the pressure space 8 into which the brake pipe opens. Each piston 7 is provided at its inner end with an elastic packing cup 9 which prevents brake fluid escaping along the cylindrical piston surface to the outside. The pistons 7 of each wheel brake cylinder coact with the brake blocks 10 which are fitted with a brake lining 11. The two brake blocks of each wheel brake cylinder are drawn towards one another by the tension spring 12, that is against the stops 12a, in so far as they are forced apart by the associated pistons 7 into the braking position, that is are pressed against the brake drum 13 of the associated wheel. For the sake of clearness the brake blocks, brake drum and tension spring of only a single wheel brake cylinder are shown. The same arrangement of course applies to the other wheel brake cylinders as well.

The piston 14 of the main pressure cylinder 1, at the inner end surface of which there is also a yielding packing cup 16, for instance of rubber, is actuated by a foot lever 17 which is suitably pivoted so as to be capable of rocking forward about the point 18. The pressure piston 14 is actuated by means of the foot operated lever 17 through the push or piston rod 19 which is pivotally connected at 20 with the foot or brake lever. According to the invention the push rod is provided with a thread which serves for the reception of a cap member (adjustable sleeve) 21 provided with a counter thread. The cap member which screws on the push rod 19 has at its forward end facing the pressure piston 14 a short, central part 22 which is rounded at its forward end and which forms with the rear side of the pressure piston a releasable contact connection. The adjustable sleeve or cap member 21 by being turned by the milled collar 23 can be screwed axially along the push rod 19 with the result, that the rodwork between the pressure piston 14 and the brake lever 17 is varied in its length, that is to say is shortened or lengthened. In other words the distance between these two parts is changed. The essential feature is, that the brake lever itself remains unaffected by this change, that is remains in its normal position, as shown, in other words always retains the same initial position. When the adjusting sleeve 21 is screwed along the push rod 19, only the position of the pressure piston 14 in the main pressure cylinder 1 changes, this piston being moved according to the direction of screwing either further into the interior of the main brake cylinder or out of the latter towards the cylinder end.

For setting the requisite initial stressing in the brake pipe system the adjustable sleeve 21 is screwed back by a suitable amount on the threaded portion of the push rod 19 in the sense of a lengthening of the rodwork between the brake lever 17 and the pressure piston 14, so that the pressure piston 14 is slid further into the interior of the main pressure cylinder 1, namely, until the desired initial stressing in the pipe system is reached. Should the initial stressing diminish in the course of time, for instance owing to fluid losses or to contraction of the brake fluid, the drop in pressure in the pipe system may at any time be compensated by a further displacement in the said sense of the pressure piston in the main pressure cylinder by means of the adjustable sleeve 21. Thus, in the case of a drop in pressure in the pipe system, the initial stressing may be at any time adjusted in a convenient manner to the original value.

Similarly with the aid of the described piston adjusting or pressure regulating arrangement the clearance between the braking surfaces 11 and 13 may be regulated by changing the initial stressing in the brake pipe system, which is of importance in the case of the brake lining becoming worn. Wear of the brake surfaces results in a considerable amount of idle motion for the brake lever. This idle motion or back lash may be eliminated again in a convenient manner when required by increasing the initial stressing in the brake pipe system by means of the described regulating or adjusting device.

The adjusting member (screw sleeve) 21 which produces the change in length of the rodwork between the pressure piston 14 and the brake lever 17 can of course, in a modified form of the constructional example illustrated and described, be easily operated by an actuating member provided on the instrument board or anywhere else at an easily accessible point near the driver's seat. In this case the adjusting member 21 is operatively connected to the said actuating member by suitable intermediate members. With such an arrangement the setting or regulation of the initial stressing in the brake pipe system can be effected at any time, even when travelling, in a convenient manner from the driver's seat.

The present invention also allows for the particular case, in which the initial stressing set in the brake pipe system increases in an undesired manner through the expansion of the brake fluid owing to the action of heat. Any unintentional increase in the initial stressing of course results in a decrease of the clearance between the brake block and the brake drum, so that these parts may in certain circumstances even come in contact with one another at an unsuitable moment. This may cause great inconvenience and danger to the driver. For preventing this a yielding stop is suitably provided for the brake lever, which, on the initial stressing set in the brake pipe system being inadvertently exceeded, allows the brake lever to yield in the sense of a uniform maintenance of the set initial stressing. In the constructional example shown in Fig. 1 a spring 24 is provided as a yielding stop for the brake lever 17 and this spring 24 is of less tension than the springs 12 whereby, in this circumstance, the tension of the springs 12 exerted on the brake fluid displaces the piston 14 and lever 17 against the tension of the spring 24, thus, full release of the brake blocks is assured. In place of the spring 24 another yielding stop, for instance a rubber cushion or pad, might be used. The amount of yield of such a stop must in every case be such, that, on the set initial stressing in the brake pipe system being involuntarily exceeded, the pressure piston can yield backwards in the main pressure cylinder.

The idea of a yielding stop for the brake lever can of course be realized independently of the provision of a piston adjusting or pressure regulating device in all hydraulic brake installations.

The return of the foot lever 17 is effected in Fig. 1 by the brake block springs.

In Fig. 2 another constructional example of the invention is shown which is also provided with an elastic stop for the brake lever. In this example 1 is again the main pressure cylinder of a hydraulic brake installation with the pressure piston 14 which, on the brake being applied, is actuated by the foot lever 25. The latter may suitably be influenced by a weak returning spring 26 which holds the foot lever, when in the position of rest, against the elastic stop in the form of a rubber cushion 27. Between the piston push rod 28 and the foot lever 25 is an adjustable lever 29. This lever 29 which serves the purpose of adjusting the pressure piston 14 is pivoted on the pin 30 which forms the pivotal point for the brake lever 25, this being effected by means of an adjusting screw (pressure applying screw) 31 which screws in the foot lever 25 and is provided with an actuating knob 32. By means of this adjusting screw the distance of the free end of the lever 29 from the foot lever 25 may be altered. On the lever 29 being forced forward by the adjusting screw 31, this motion is transmitted to the push rod and thence to the pressure piston 14 in the main pressure cylinder 1. The adjustable lever 29 is pivotally connected to the push rod 28. On to the end of the push rod facing the pressure piston 14 the actual push member which acts on the said piston is mounted in the form of a sleeve or a slip pin 33. On the external surface of this sleeve 33 there are tooth-like projections 34, which serve as abutments for the spring ratchet members 35 in the direction of the pressure piston. Between the slipped over sleeve and the ratchet mechanism there is a compression spring 36 which bears at one end against the bottom of the ratchet mechanism and at the other end against that end of the member 33, which faces it. The part 37 of the push rod 28 is provided with an external thread for coacting with the adjusting nut 38 which bears from the outside against the end of the ratchet mechanism. By turning the adjusting nut 38 in the direction towards the pressure cylinder 1 the sleeve 33 is pushed forward on the cylindrical smooth part 39 of the push rod 28 and the pressure piston 14 is moved further into the interior on the main pressure cylinder. The fluid in the brake pipe system is thereby stressed. Should the initial stressing thus produced be insufficient, the pressure piston 14 can be advanced still further into the pressure cylinder by turning the adjusting screw 31 by means of the knob 32, so that the initial stressing in the brake pipe system is increased to a corresponding extent.

As already explained with reference to the construction shown in Fig. 1, the turning of the adjusting screw 31 or of the adjusting nut 38 can also be effected from a point which is easily and conveniently accessible from the driver's seat, for instance through the provision of a suitable actuating member on the instrument board. In some cases only one of the two adjusting arrangements shown in Fig. 2 will suffice. What is essential, however, is that the adjusting arrangement shall be so constituted that the pressure piston can be displaced in the main brake cylinder, the brake actuating lever remaining in its position of rest, so as to produce or regulate the initial stressing in the brake pipe system.

Through the interposition of the spring 36 between the brake operating lever and the pressure piston 14 the initial stressing set in the brake pipe system may be continuously maintained. If for instance the initial stressing in the brake pipe system should diminish, either through fluid losses or through the contraction of the fluid the compression spring 36 will force the member 33 and with it the pressure piston 14 forwards in the direction of the main pressure cylinder. At the same time the ends of the spring ratchet members 35 will slide along on the tooth-like projections 34, until they engage in fresh notches or teeth in accordance with the forward motion of the pressure piston.

What I claim is:

1. A hydraulic brake installation comprising a brake operating lever, a main brake cylinder, a pressure piston slidable in said cylinder, and adjustable members interposed between said piston and said lever, certain of said adjustable members having screw-threaded engagement with each other whereby the pressure piston may be adjusted independently of said lever while simultaneously varying the initial brake pressure, a spring disposed between said adjustable members and adapted to maintain a uniform initial stressing in the brake pipe system, and a ratchet device interposed between said adjustable members, said ratchet device including ratchet teeth formed on one of said adjustable members, and a pawl cooperating with said teeth and with said spring.

2. In a hydraulic brake apparatus, the combination with a master cylinder, a piston in said cylinder, and a brake lever, of a rod directly connected to said piston and to said lever, and a yielding abutment against which the brake lever rests in the normal position.

3. In a hydraulic brake apparatus, the combination with a master cylinder, a piston in said cylinder, and a brake lever, of a rod directly connected to said piston and to said lever and a rubber cushion against which the brake lever engages in the position of rest.

HERMANN KURT WEIHE.